United States Patent

Takada et al.

[11] Patent Number: 4,892,344
[45] Date of Patent: Jan. 9, 1990

[54] PARALLEL GRIPPER

[75] Inventors: Susumu Takada; Kouichirou Ishibashi, both of Soka, Japan

[73] Assignee: SMC Corporation, Tokyo, Japan

[21] Appl. No.: 196,422

[22] Filed: May 20, 1988

[30] Foreign Application Priority Data

May 25, 1987 [JP] Japan ................... 62-078398

[51] Int. Cl.⁴ ............................................. B25J 15/08
[52] U.S. Cl. ................................ 294/88; 294/119.1; 901/37
[58] Field of Search ............ 294/88, 115, 116, 119.1; 279/110, 118, 119, 123; 901/36, 37, 39, 31

[56] References Cited

U.S. PATENT DOCUMENTS

| | | | |
|---|---|---|---|
| 4,569,549 | 2/1986 | Nakashima et al. | 294/88 |
| 4,577,898 | 3/1986 | Nusbaumer et al. | 294/88 |
| 4,593,948 | 6/1986 | Borcea et al. | 294/88 |
| 4,607,873 | 8/1986 | Nusbaumer et al. | 294/88 |
| 4,629,237 | 12/1986 | Ito | 294/88 |
| 4,707,013 | 11/1987 | Vranish et al. | 294/88 X |
| 4,729,588 | 3/1988 | Kratzer | 294/88 |

FOREIGN PATENT DOCUMENTS

| | | | |
|---|---|---|---|
| 570114 | 8/1961 | Belgium | 294/119.1 |
| 237424 | 7/1986 | German Democratic Rep. | 294/119.1 |
| 751622 | 7/1980 | U.S.S.R. | 294/116 |
| 870111 | 10/1981 | U.S.S.R. | 901/37 |
| 1122505 | 11/1984 | U.S.S.R. | 294/116 |

Primary Examiner—Johnny D. Cherry
Attorney, Agent, or Firm—Oblon, Spivak, McClelland, Maier & Neustadt

[57] ABSTRACT

In this parallel gripper suitable for gripping a work for a robot or the like, in which a pair of fingers are opened and closed by keeping the parallel condition between them by the transmission of the driving force of a fluid pressure actuator to the fingers by means of a power transmission mechanism, use is made of a pair of pistons, that are relatively slidable in a single cylinder bore under the action of fluid pressure, as the fluid pressure actuator, thereby obtaining substantially twice as large gripping force as in the case of empolying a single piston. Further, simplification in constitution and reduction in weight of the parallel gripper are achieved by constructing the gripper so as to supply a pressurized fluid to the pressure chamber formed between the pair of pistons in the cylinder bore, and by transmitting the driving force of both pistons that are driven in the mutually opposite directions to the fingers by means of a simple power transmission mechanism which employs levers as its principal components.

8 Claims, 6 Drawing Sheets

PARALLEL GRIPPER

TECHNICAL FIELD OF THE INVENTION

The present invention relates to a parallel gripper which is used for gripping a work in an industrial machine such as a robot.

DESCRIPTION OF PRIOR ART

The use of a parallel gripper for gripping a work in a robot or the like which is driven by means of a fluid pressure actuator has already been known for some time.

Since the parallel gripper is usually installed on the tip of an arm of a robot or the like, the fluid pressure actuator is required to be compact in order to make the mechanism for supporting and driving of the gripper small-scale and light-weight.

However, mere compactification of the fluid pressure actuator brings about a decrease in the gripping force of the gripper which leads to a problem, when an arm with the gripper installed is started to be moved or stopped suddenly, that the gripper fails to hold the work firmly because of the fall-off or slip of the work due to inertial force.

In this case, one may easily think of increasing the pressure of the fluid which operates the actuator. However, increasing the fluid pressure leads also to the problems that the actuator becomes large in size and heavy, as well as the necessity of introducing a pressure booster or the like because the line air in the factory is normally kept under a prescribed pressure.

OBJECTS OF THE INVENTION

The principal object of the present invention is to provide a compact parallel gripper which is suited for a robot or the like to grip a work and yet can provide a sufficiently large gripping force.

Another object of the present invention is to provide a parallel gripper wherein use is made of a pair of pistons relatively slidable under the pressure of a fluid as a fluid pressure actuator for driving the opening and closing of the parallel gripper, in a single cylinder bore, so that a gripping force substantially twice as large as that of the case of using a single piston can be obtained.

Another object of the present invention is to provide a simple and light-weight parallel gripper by constituting it so as to transmit the driving forces of pistons which are driven in the mutually opposite directions, generated by a pressurized fluid supplied to the pressure chamber formed between a pair of pistons in a cylinder bore, to fingers through a simple power transmission mechanism that uses levers as the main bodies.

Another object of the present invention is to simplify the structure of a parallel gripper as well as the supply and discharge system of the pressurized fluid for the gripper, by directly applying a returning force only to one of the pistons, and by carrying out the return of the other piston via a power transmission mechanism which employs levers as the main bodies, at the time of opening the fingers to release a work being grasped.

SUMMARY OF THE INVENTION

In order to achieve the above objects, in a parallel gripper which opens and closes a pair of fingers in parallel by transmitting the driving force of the fluid pressure actuator to the fingers through a power transmission mechanism, the fluid pressure actuator of the present invention is constituted by disposing a pair of pistons which can slide relative to each other, with pressure chambers formed therebetween, in a cylinder bore provided in the body. The pair of fingers are supported slidably in the direction perpendicular to the axial direction of the cylinder bore by means of guiding members provided in the body. The power transmission mechanism consisting of a pair of levers is so arranged as to carry out the closing and opening operation for gripping and releasing a work with fingers by the action of the two pistons, in which one end of the respective levers is mounted pivotally on one of the two pistons while the other end is abutted on the other piston, and the bent portion in the middle is mounted pivotally on each of the two fingers that move in parallel.

In such a parallel gripper, the pair of pistons are driven in the mutually opposite directions by the action of a pressurized fluid supplied to the pressure chambers formed betweens the pair of pistons, which in turn drive the pair of levers, causing the fingers that are pivotally mounted on the middle portions of the respective levers to grip a work. In this case, the force for gripping the work can be made very large because of the larger forces due to the two pistons acting on the levers which drive the fingers. Moreover, the pair of pistons are disposed relatively slidably in a single cylinder bore so that the fluid pressure actuator for driving the gripper can be made very compact.

Further objects of the present invention will be made precise by the description of the embodiments that follows.

BRIEF DESCRIPTION OF THE DRAWINGS

FIG. 1 to FIG. 4 show a first embodiment of the present invention in which FIG. 1 is its disassembled perspective view.

FIG. 2 is its front view whose upper half is sectional and a guide member 15 of this side is removed.

FIG. 3 is a partially cutaway side view.

FIG. 4 is a front view whose upper half is sectional and a guide member 15 of this side is removed, which illustrates the closed state of the fingers.

DESCRIPTION OF THE EMBODIMENTS

Figure 1:
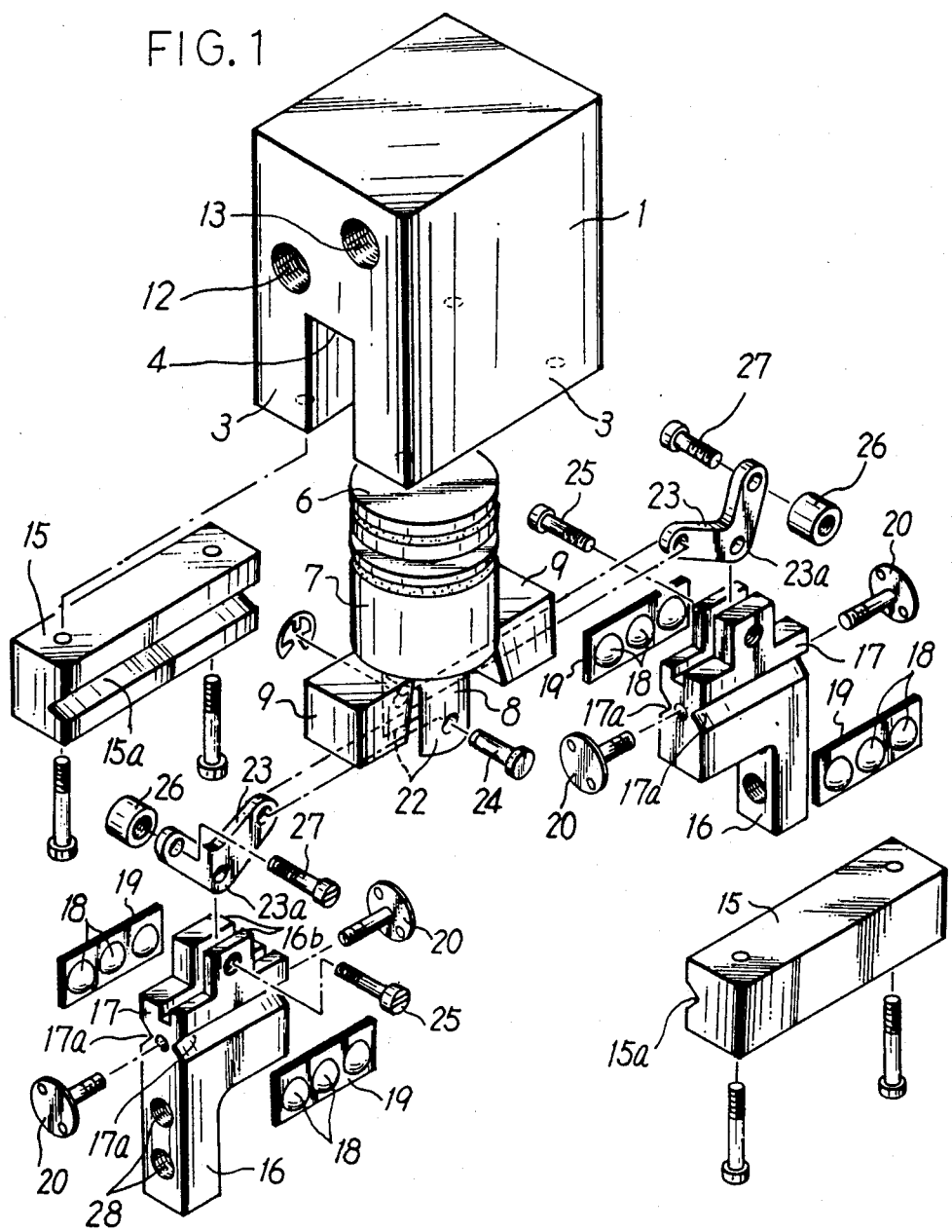

In the first embodiment of the present invention shown in FIG. 1 to FIG. 4, body 1 of a parallel gripper with the appearrance of an approximately rectangular parallelepiped has cylinder bore 2 drilled from one side of its ends, skirt sections 3 and 3 that are formed extending from the open end side of the cylinder bore, at the opposing positions with the bore in between, thereby forming grooves 4 which cross the cylinder bore 2 between the skirt sections 3 and 3.

Within the cylinder bore 2 of the body 1, there is formed a fluid pressure actuator by fitting in it a pair of pistons 6 and 7 that are freely slidable. These pistons 6 and 7 are disposed so as to be relatively slidable by arranging rod 8 of the inner piston 6 to penetrate airtightly through a through hole formed in the outer piston 7. Further, the outer piston 7 has, on both sides of the through hole into which is inserted the rod 8, guide sections 9 and 9 that slide along the grooves 4 in the axial direction of the cylinder bore 2. In the body 1, between the pistons 6 and 7 and in the vicinity of the bottom wall, there are opened ports 12 and 13 for supplying and discharging a pressurized fluid to and from pressure chambers 10 and 11, respectively, that are partitioned by the pistons 6 and 7.

On the tip surfaces of the skirt sections 3 and 3 there are fixed a pair of rodlike guide members 15 and 15 of approximately rectangular cross-section, positioned on both sides of the grooves 4 formed between the skirt sections 3 and 3, with V-shaped guide grooves 15a and 15a provided thereon facing with each other. These guide grooves 15a and 15a are oriented bore 2, and base sections 17 and 17 of a pair of fingers 16 and 16 for gripping a work are disposed between the guide members so as to be slidable along the guide grooves 15a and 15a. The base sections 17 and 17 of these fingers 16 and 16 have guide grooves 17a and 17a that are opposed to the respective guide grooves 15a and 15a, with ball holders 19, holding a plurality of freely rotatable balls 18, interposed between the respective pairs of guide grooves 15a and 17a. The ball holders 19, play a role similar to that of the retainers in the case of ball bearings, and their dropping off the guide grooves 17a of the base sections 17 is prevented by stoppers 20, that are screwed on both ends in the longitudinal direction of the base sections 17 and 17 of the fingers 16 and 16. Accordingly, the fingers 16 and 16 slide by maintaining parallel condition regulated by the guide members 15 and 15, wherein the frictional force between the fingers 16 and 16 and the guide members 15 and 15 is made small since the fingers are supported via the balls 18.

Here, rollers may be used in place of the balls in the above in which case it becomes necessary to employ roller holders that hold a plurality of freely rotatable rollers instead of the ball holders.

As a power transmission mechanism for transmitting the driving force of the fluid pressure actuator to the pair of fingers 16 and 16, levers 23 and 23 for opening and closing the fingers with their parallelism maintained are provided between the pistons 6 and 7 and the base sections 17 and 17 of the fingers 16 and 16.

Namely, between supporting members 22 and 22 that are provided on the extension of the rod 8, there are pivotally mounted, with center pin 24, one end of each of the pair of levers 23 and 23 that are bent in their middle portions 23a to form an angle which is somewhat greater than a right angle. The levers 23 and 23 are swingably attached in their bent portions 23a at the middle to projections 16b and 16b formed in the base sections 17 of the fingers 16 and 16 with finger pin 25, while on the other ends opposite to the ends pivotally mounted on the supporting members 22 and 22 there are rotatably attached rollers 26 which make a contact with the bottom surface of the guide sections 9 and 9 with roller pins 27.

Figure 3:
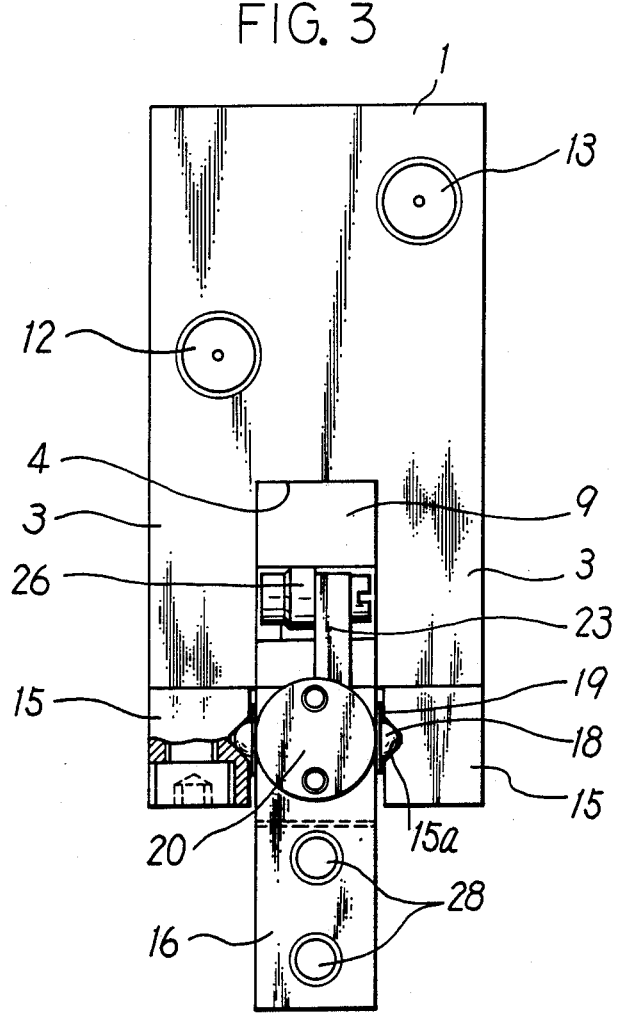

In FIG. 3, reference numeral 28 represents a screw hole for fitting a gripping tool to be attached selectively to the fingers 16 in accordance with the object to be gripped by the parallel gripper.

Now, the operation of the present embodiment will be described.

Figure 2:
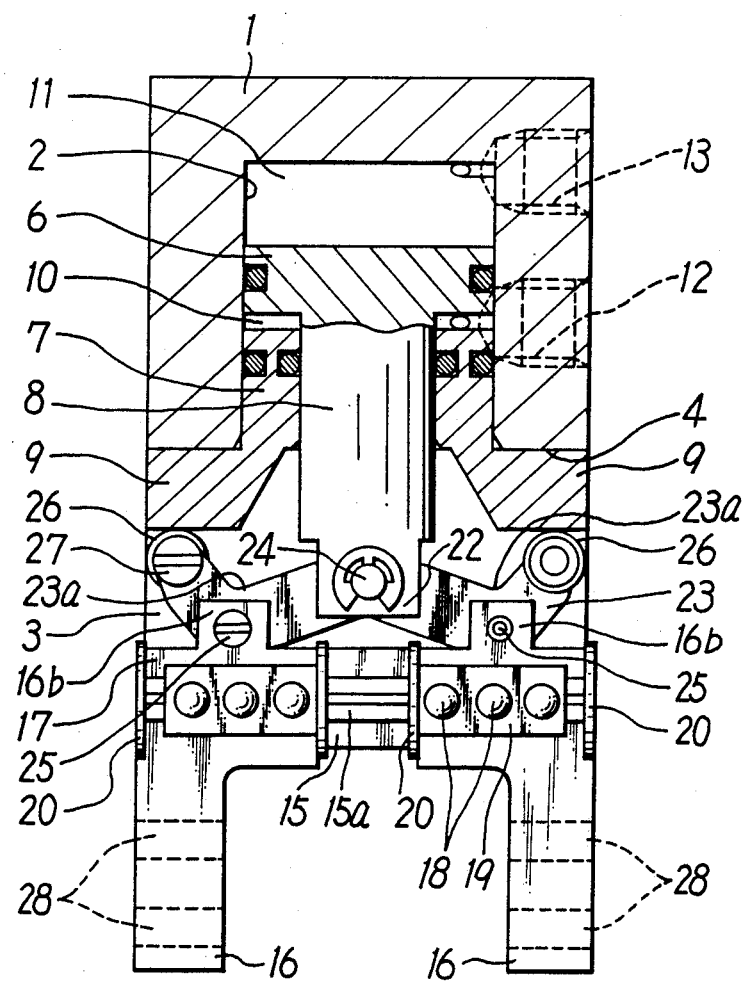

FIG. 2 shows the state in which the piston 6 has completed its downward stroke under the action of the compressed air which is supplied to the pressure chamber 11 through the port 13, with the port 12 opened to the atmosphere. In this case, the end sections of the pair of levers 23 and 23 pivotally mounted on the tip of the rod 8 by means of the center pin 24 are pushed downward by the rod 8. Since the motion in the sliding direction of the piston 6 of the fingers 16 and 16 on which are pivotally mounted the middle portions 23a and 23a of the levers 23 and 23 are constrained by the guide members 15 and 15, the middle portions 23a and 23a of both levers 23 and 23 are forced to expand in the horizontal direction accompanying the drive of the piston 6, opening the fingers 16 and 16 that are pivotally mounted on the levers 23 and 23 by means of the finger pins 25 and 25. In addition, as the piston 6 is driven, the rollers 26 on the tip of the levers 23 and 23 push the guide sections 9 of the piston 7, thereby returning the piston 7 to the end of the upward stroke.

When the pressurized fluid is supplied to the pressure chamber 10 through the port 12 and the fluid is discharged from the pressure chamber 11 via the port 13 in this state, the piston 6 is lifted and at the same time the piston 7 is lowered. Accordingly, the ends of the levers 23 and 23 that are pivotally mounted on the tip of the rod 8 are pulled up and the tips of the levers 23 and 23 whose rollers 26 are pressed downward are lowered, so that the fingers 16 and 16 that are pivotally mounted on the levers 23 and 23 with the finger pins 25 and 25 are slid in the direction to come closer with each other. Therefore, the pair of fingers 16 and 16 slide in their closing direction to grip a required work 30 between the fingers 16 and 16 or between appropriate gripping tools which are fitted to the fingers 16 and 16 by means of the screw fitting holes 28, and this state is maintained by the fluid pressure that is applied on the pistons 6 and 7 (see FIG. 4).

In the above case, the fingers 16 and 16 are slid in the closing direction by the resultant of the driving force obtainable by the piston 6 and the driving force obtainable by the piston 7, so that the work can be gripped with a force which is substantially twice as large as that of the case of employing a single piston. Moreover, the driving forces of the pistons 6 and 7 are transmitted to the levers 23 and the fingers 16 via the pivotally mounted parts and the rotating parts. Therefore, it is possible to prolong the service life of the gripper by reducing the frictional resistance and the wear of the contacting parts.

Furthermore, the construction described in the above, in which the middle portions 23a of the levers 23 and 23 are pivotally mounted on the fingers 16 and 16 with the middle portions 23a bent to some extent, is effective in substantially uniformizing the force which acts during the strokes of the fingers 16 and 16.

Figure 4:
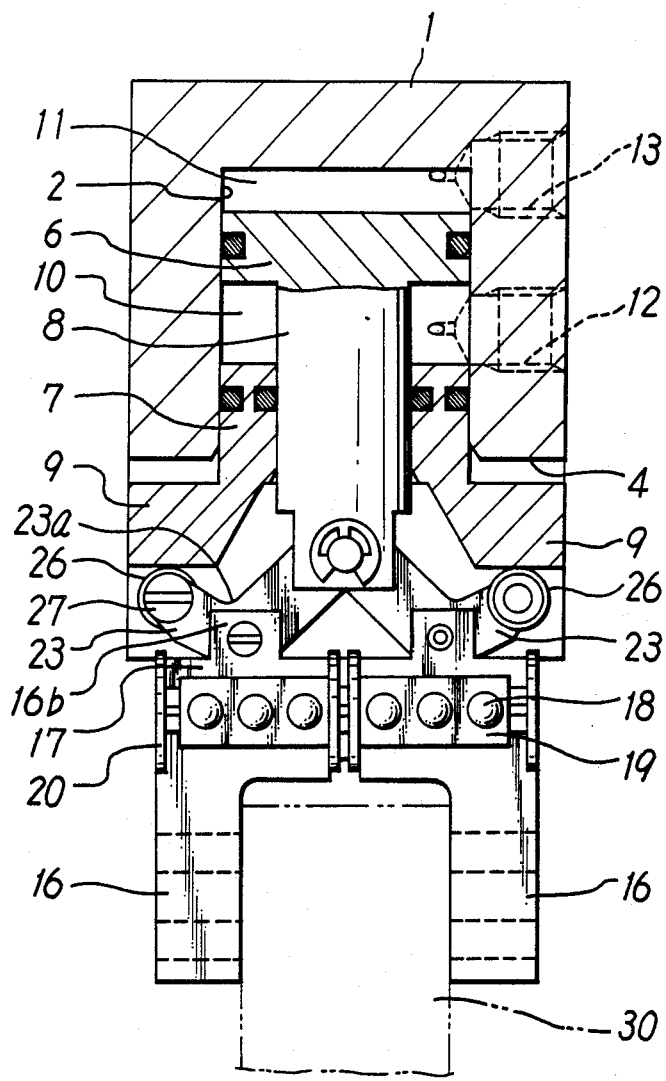

Next, when the supply and discharge of the pressurized fluid to and from the pressure chambers 10 and 11 are reversed from the state illustated in FIG. 4, one end of each of the levers 23 and 23 is pressed down by the piston 6, so that both fingers 16 and 16 are slid in the direction of mutural separation, releasing the gripping force on the work. Further, by the force pushing up the piston 7 with the rollers 26 and 26 that make contact with the guide sections 9 and 9, the piston 7 is returned to its state shown in FIG. 2. In this case, the return of the piston 7 can be accomplished easily because the pressure chamber 10 is opened to the atmosphere.

Figure 5:
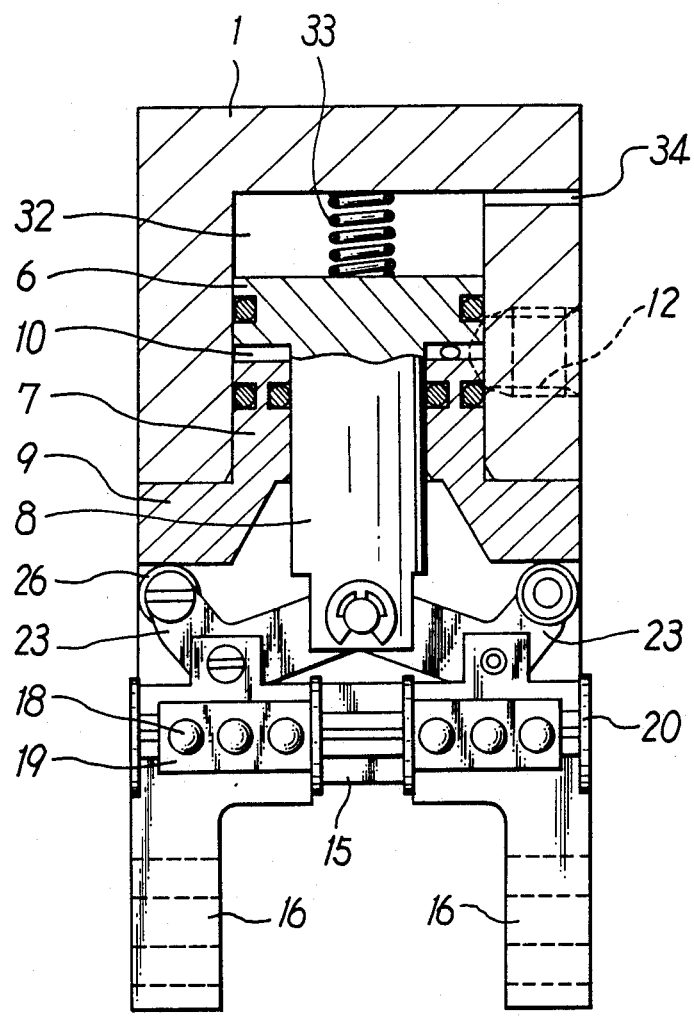
FIG. 5 is a second embodiment of the present invention. and front view whose upper half is sectional and a guide member 15 of this side is removed.

In the second embodiment shown in FIG. 5, the reciprocating motion of the piston 6 by the supply and discharge of the pressurized fluid to and from the ports 12 and 13 in the first embodiment is replaced by the supply of the pressurized fluid to the pressure chamber 10 through a similar port 12 only for the gripping of the work while the return of the fingers 16 and 16 is carried out by the use of the force of a spring. For this purpose, respiratory chamber 32 is provided within the cylinder bore 2 over the piston 6, a return spring 33 which supplies a returning force to the piston 6 is installed compressedly in the respiratory chamber 32, and a respiratory port 34 is opened in the respiratory chamber 32.

Other construction of the second embodiment is substantially identical to the first embodiment so that identical or equivalent parts in FIG. 5 are given identical symbols to omit detailed description.

In the second embodiment, the piston 6 is moved upward in the figure by the action of the pressurized fluid supplied to the pressure chamber 10 by compressing the spring 33, and the piston 6 is returned by the energizing force of the spring 33 when the pressurized fluid in the pressure chamber 10 is discharged to the outside. Hence, the fingers 16 and 16 can be operated by the supply and discharge of the pressurized fluid to and from the pressure chamber 10 alone. Other operations are similar to the case of the first embodiment.

Figure 6:
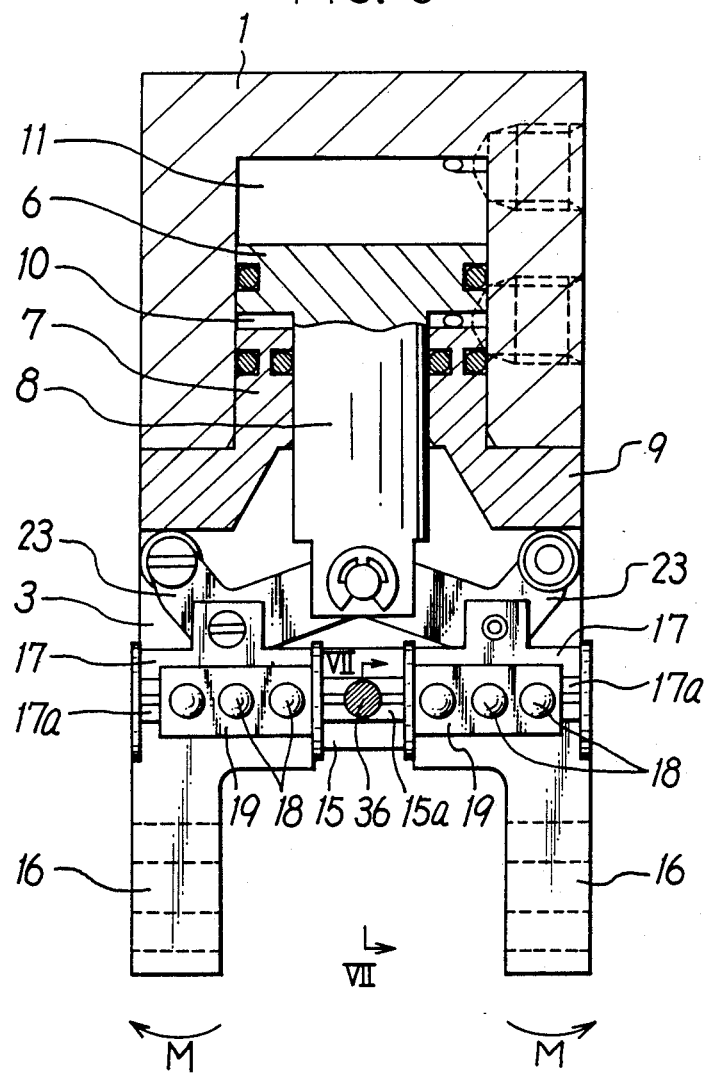
FIG. 6 is a still another embodiment of the present invention, and a front view whose upper half is sectional and a guide member 15 of this side is removed.

In the case of gripping work with a large force by means of a pair of fingers, a part of the reactive force to the gripping force acts on the fingers as a moment M in the direction which tends to open the pair of fingers (see Fig. 6). The moment M acts on the base sections 17 and 17 of the fingers 16 and 16 in the direction which pressed the balls 18, disposed between the guide grooves 15a and 17a of the guide members 15 and 15 and the base sections 17 and 17, against the inclined groove walls in the guide grooves that constitute the V form, within the plane parallel to that of the paper of FIG. 6. Because of this, each ball 18 tends to move in the direction to ride on the inclined groove walls of the guide groove, and as a result, the interval between the skirt sections of the body 1 and the guide members thereon is forced to expand by the action of the balls 18.

Here, the expansion in the interval between the guide members permits the riding to some extent of the balls 18 on the inclined groove walls of the guide grooves so that the parallelism of the fingers 16 and 16 is disturbed, making the gripping of the work unstable. Such a problem tends to occur in particular when the body of the gripper is formed with a raw material, such as light metal and synthetic resin, with insufficient strength in order to make the gripper light-weight.

Figure 7:
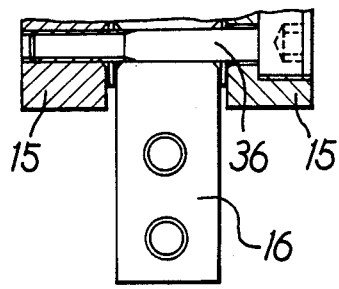
FIG. 7 is the longitudinal sectional view along the line VII—VII of FIG. 6.

In an embodiment shown in FIG. 6 and FIG. 7, expansion of the finger supporting section is prevented by mutually linking and fixing the centers of the pair of guide members 15 and 15 installed on the skirt sections 3 and 3 with bolt 36 in order to cope with the above problem. Although the linking position of the guide members 15 and 15 with the bolt 36 is chosen in this embodiment at the center in the longitudinal direction of the guide members so as not to obstruct the motion of the base sections 17 and 17 of the fingers 16 and 16, it may be chosen at another position. Further, the mutual linkage may be accomplished by the use of an appropriate linking means other than the bolt.

Here, other constructions and operations of this embodiment are substantially identical to those of the first embodiment so that identical or corresponding components are given identical symbols to omit further description.

In the foregoing, desirable embodiment modes of the present invention have been described. However, the present invention is not limited to those embodiments along, and can be of course modified appropriately with respect to its design without deviating from the scope of the claims to be presented next.

What is claimed is:

1. A parallel gripper which opens and closes a pair of fingers while keeping parallelism between said fingers by transmitting driving force of a fluid pressure actuator to the fingers by means of a power transmission mechanism, which comprises:

the fluid pressure actuator is constructed by arranging a pair of pistons in a single cylinder bore provided in a body, the pair of pistons having the same diameter and being mutually slidable in the cylinder bore, one of the pistons which is an outer piston having a center hole and guide sections on both sides of the center hole, the other piston which is an inner piston being provided with a rod which passes slidably and hermetically through the center hole, wherein a pressure chamber is defined between the pistons, the pair of fingers are supported slidably in a direction perpendicular to the axial direction of the cylinder bore by means of guide members provided on the body, the power transmission mechanism consists of a pair of levers, in which one end of each lever is pivotally connected on the rod of the inner piston such that said one end of each lever moves with said inner piston, the other end of each lever being in contact with each guide section of the outer piston, and a bent portion at the middle of each lever is mounted pivotally on each finger such that the two fingers move relatively in parallel, so that the opening and closing operation for gripping with the fingers is realized by driving of both pistons and a port for supplying and discharging a pressurized fluid into the pressure chamber between the pair of pistons to open and close the fingers for gripping a work.

2. A parallel gripper as claimed in claim 1, wherein skirt sections are provided as extensions of the body adjacent an opening on said cylinder bore at positions opposed to each other with said bore in between, and said guide members being provided at said skirt sections for supporting said fingers to be freely slidable.

3. A parallel gripper as claimed in claim 2, wherein V-shaped guide grooves are formed on the opposed surfaces of a pair of the guide members, including V-shaped guide members, in base sections of the pair of fingers, and the pair of fingers are supported slidably by the guide members by interposing a ball holder which holds a plurality of balls that can be rolled freely between a guide groove on the guide member and a corresponding guide groove in the base sections of the fingers.

4. A parallel gripper as claimed in claim 2, wherein the guide members are arranged oppositely with each other in the skirt sections in the body and are linked mutually by means of a linking member.

5. A parallel gripper as claimed in claim 1, wherein said guide sections are slidable in the axial direction of the cylinder bore, guided by grooves provided at an opening of the cylinder bore of the body.

6. A parallel gripper as claimed in claim 5, wherein a roller which makes a contact with an outer surface of a guide section of the outer piston is attached rotatably on said other end of each lever.

7. A parallel gripper as claimed in claim 1, including a port opened to a pressure chamber formed between the inner piston and a bottom wall of the cylinder bore for supplying and discharging the pressurized fluid for causing the inner piston to carry out a returning operation.

8. A parallel gripper as claimed in claim 1, including a return spring fitted compressedly in a respiratory chamber formed between the inner piston and a bottom wall of the cylinder bore for causing the inner piston to carry out a returning operation.

* * * * *